US009665292B2

(12) United States Patent
Vellimalai et al.

(10) Patent No.: US 9,665,292 B2
(45) Date of Patent: May 30, 2017

(54) SYSTEM AND METHOD FOR PROVIDING CONSISTENT METADATA FOR RAID SOLUTIONS

(71) Applicant: Dell Products, LP, Round Rock, TX (US)

(72) Inventors: Ashokan Vellimalai, Bangalore (IN); Deepu S. Sreedhar M, Kalikut (IN); Sandeep Agarwal, Bangalore (IN); Anup Atluri, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 2 days.

(21) Appl. No.: 14/592,270

(22) Filed: Jan. 8, 2015

(65) Prior Publication Data

US 2016/0202920 A1     Jul. 14, 2016

(51) Int. Cl.
*G06F 3/00*     (2006.01)
*G06F 3/06*     (2006.01)

(52) U.S. Cl.
CPC .......... *G06F 3/0613* (2013.01); *G06F 3/0607* (2013.01); *G06F 3/0632* (2013.01); *G06F 3/0689* (2013.01); *G06F 2211/1004* (2013.01); *G06F 2212/262* (2013.01)

(58) Field of Classification Search
None
See application file for complete search history.

(56) References Cited

U.S. PATENT DOCUMENTS

| | | | | |
|---|---|---|---|---|
| 5,822,782 A * | 10/1998 | Humlicek | ............. | G06F 3/0626 711/114 |
| 5,950,230 A * | 9/1999 | Islam | .................. | G06F 11/2289 710/10 |
| 6,085,332 A * | 7/2000 | El-Batal | .................... | G06F 1/24 710/1 |
| 6,098,119 A * | 8/2000 | Surugucchi | ........... | G06F 3/0626 710/10 |
| 6,243,790 B1 * | 6/2001 | Yorimitsu | ............. | G06F 3/0607 710/8 |
| 6,343,324 B1 * | 1/2002 | Hubis | ................... | G06F 3/0622 709/229 |
| 6,363,457 B1 * | 3/2002 | Sundberg | ............. | G06F 3/0607 711/114 |
| 6,549,978 B2 * | 4/2003 | Mansur | ................. | G06F 3/0607 710/8 |
| 6,629,158 B1 * | 9/2003 | Brant | .................... | G06F 3/0607 710/10 |
| 6,718,436 B2 | 4/2004 | Kim et al. | | |
| 7,146,463 B2 * | 12/2006 | Mukker | ................ | G06F 3/0608 711/114 |

(Continued)

*Primary Examiner* — Kaushikkumar Patel
(74) *Attorney, Agent, or Firm* — Larson Newman, LLP (57) ABSTRACT

An information handling system includes a plurality of physical disks, a memory to store metadata for the physical disks, and a controller. The controller is configured to communicate with the physical disks and with the memory. The controller to receive a request to enable a redundant array of independent disks (RAID) mode on the physical disks, to allocate a portion of the memory to store the metadata while in the RAID mode, to store the metadata for the physical disks in each of the physical disks and in the portion of the memory, and to update and synchronize the metadata in response to a configuration change of the physical disks.

18 Claims, 5 Drawing Sheets

(56) References Cited

U.S. PATENT DOCUMENTS

| | | | | |
|---|---|---|---|---|
| 7,478,269 | B2* | 1/2009 | Wong | G06F 11/1096 |
| | | | | 711/114 |
| 7,529,968 | B2* | 5/2009 | Prabhakaran | G06F 11/1076 |
| | | | | 714/6.11 |
| 8,225,038 | B2* | 7/2012 | Jibbe | G06F 3/0604 |
| | | | | 711/100 |
| 8,370,574 | B2* | 2/2013 | Ballard | G06F 11/073 |
| | | | | 711/100 |
| 2003/0182494 | A1* | 9/2003 | Rodrigues | G06F 3/0601 |
| | | | | 711/100 |
| 2004/0123032 | A1 | 6/2004 | Talagala et al. | |
| 2005/0076260 | A1* | 4/2005 | Hung | G06F 11/1092 |
| | | | | 714/6.12 |
| 2007/0294476 | A1 | 12/2007 | Corn et al. | |
| 2010/0287348 | A1 | 11/2010 | Sampathkumar | |
| 2011/0208957 | A1* | 8/2011 | Thompson | G06F 3/0607 |
| | | | | 713/2 |

* cited by examiner

SYSTEM AND METHOD FOR PROVIDING CONSISTENT METADATA FOR RAID SOLUTIONS

FIELD OF THE DISCLOSURE

The present disclosure generally relates to system and method for providing consistent metadata for RAID solutions.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems utilize redundant arrays of independent disks (RAID) to provide data redundancy and to improve performance of the memory devices. Depending on the RAID solution implemented in the information handling system, the number of disks utilized in the RAID configuration can vary, and parity information can be stored in one or more of the disks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
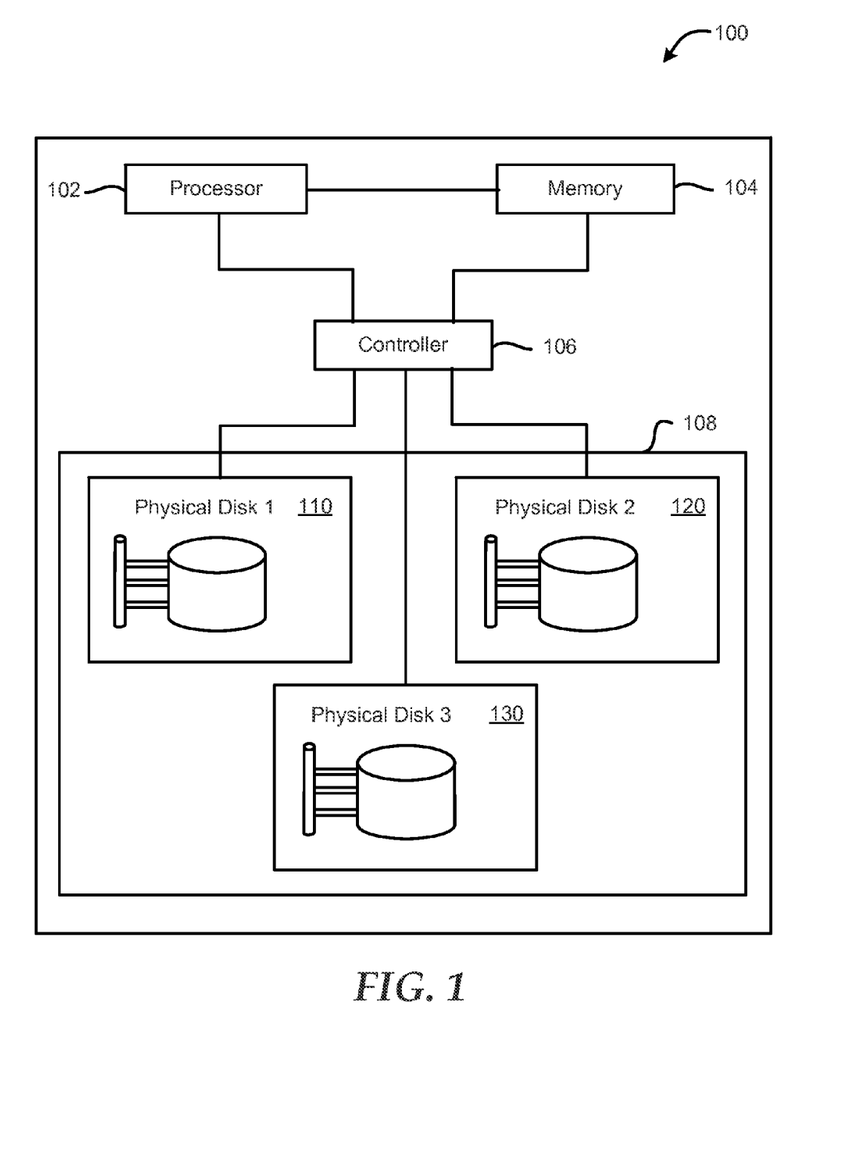
FIG. 1 is a block diagram of an information handling system.

FIG. 1 shows an information handling system 100. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system 100 includes a processor 102, memory 104, controller 106, and a disk array 108, which in turn can include physical disks 110, 120, and 130. The processor 102 is in communication with the memory 104 and with the controller, which in turn is in communication with the physical disks 110, 120, and 130 of the disk array 108.

In different embodiments, the processor 102 may include any system, device, or apparatus operable to interpret and/or execute program instructions and/or process data. The processor 102 may include one or more: microprocessors, micro controllers, digital signal processors (DSP), application specific integrated circuits (ASIC), or another digital or analog circuitry configured to interpret and/or execute program instructions and/or process data. In some embodiments, processor 102 may interpret and/or execute program instructions and/or process data stored locally, such as in memory 104. In the same or alternative embodiments, processor 102 may interpret and/or execute program instructions and/or process data stored remotely.

The memory 104 may include any system, device, or apparatus operable to retain and/or retrieve program instructions and/or data for a period of time, such as a non-transitory computer-readable media. The memory 104 may also include one or more modules; such modules can include random access memory (RAM), electrically erasable programmable read-only memory (EEPROM), a PCMCIA card, flash memory, magnetic storage, opto-magnetic storage, and/or a suitable selection and/or array of volatile or nonvolatile memory that retains data after power to its associated information handling system, such as information handling system 100, is powered down.

In some embodiments, disk array 108 may form all or part of a redundant storage array, such as a Redundant Array of Independent Disks (RAID) configuration. In different embodiments, the physical disks 110, 120, and 130 of the disk array 108 can include different number of platters and different numbers of read/write heads.

In particular embodiments, controller 106 may be a hardware or hardware-based disk array controller, a software, software-based, or operating-system-based disk array controller, and/or a firmware or driver-based disk array controller. Disk array controller 106 may be configured for managing distribution of data across the physical disks 110, 120, and 130 of disk array 108, and storing metadata associated with the physical disks in the memory 104. Controller 106 may perform the data distribution management in response to commands (e.g., read commands, write commands) received by controller from processor 102. In some embodiments, controller 106 may comprise a RAID controller. For example, if RAID is implemented using disk array 108, then controller 106 may configure how stored data is mirrored and/or striped across the plurality of disk drives 110, 120, and 130.

In some embodiments, one or more aspects of controller 106 may be an integral part of a storage enclosure housing disk array 108, an integral part of information handling system 100, embedded into the firmware or software of the operating system of the information handling system 100, embedded in one or both of disk drives 110, 120, and 130, or the like. Disk drives 110, 120, and 130 may comprise any suitable system, device, or apparatus used for storing and retrieving digital information; for example, disk drives 110 and 120 may be hard disk drives (HDD), serial advanced technology attachment (SATA) drives, parallel advanced technology attachment (PATA) drives, or integrated drive electronics (IDE) drives. Disk drives 110, 120, and 130 may consist of one or more rotating disks or platters that contain two surfaces for data storage on each side of the disks. The platters may have magnetic heads and may be arranged on a moving actuator arm to read data from, and write data to, the disk surfaces. In certain embodiments, disk drives 110, 120, and 130 may comprise different RAID configurations, such that their individual disks contain parity information and data.

During operation, an individual can provide a request to controller 106 to enable a RAID mode in the disk array 108. In an embodiment, the RAID mode can be referred to as a software RAID mode to create a software RAID solution for the information handling system 100, such that the number of disk drives utilized in a RAID configuration is set by the controller 106 and not the total number of disk drives within the disk array 108. The controller 106 can then request for a dedicated contiguous space in the memory 104. In an embodiment, the memory 104 can be any type of static memory, such as a basic input/output-serial peripheral interface (BIOS-SPI) flash memory. In an embodiment, the processor 102 can be part of a chipset for the information handling system, such as a Wellsburg chipset, and the memory 104 can be connected to the SPI interface of the processor.

Once the requested space is allocated on the memory 104, the controller 106 can create a virtual disk in the disk array 108 by assigning one or more of the physical disks 110, 120, and 120 to the virtual disk. The controller 106 can then store metadata for the virtual disk, such as information indicating the physical disks assigned to the virtual disk, in the allocated portion of the memory 104 and on each of the physical disks 110, 120, and 130. After one or more virtual disks are created, configuration changes in can happen within the virtual disk, such as a physical disk is removed from the disk array 108 and the virtual disk. In response to configuration changes, the metadata for the virtual disk can be updated within the memory 104, and the metadata can then be synchronized from memory to each of the physical disks 110, 120, and 130. The synchronization of the metadata in response to each configuration change can ensure that the most recent metadata can be stored on the memory 104 and each of the physical disks 110, 120, and 130.

In an embodiment, a configuration change can arise in response to a hotplug, such as insertion and removal, disk host system/group host system (DHS/GHS) assignment, and physical disk migration, and these configuration changes will not cause any undesirable behavior in the virtual disk or the disk array 108. For example, every time a physical disk 110, 120, or 130 is inserted or removed from the system, the controller 106 initiates a rescan of the physical disks and the memory 104 is updated with the metadata for the latest configuration of physical disk. The metadata on the physical disks is then synchronized with the memory 104 to update the metadata stored on the physical disks.

Figure 2:
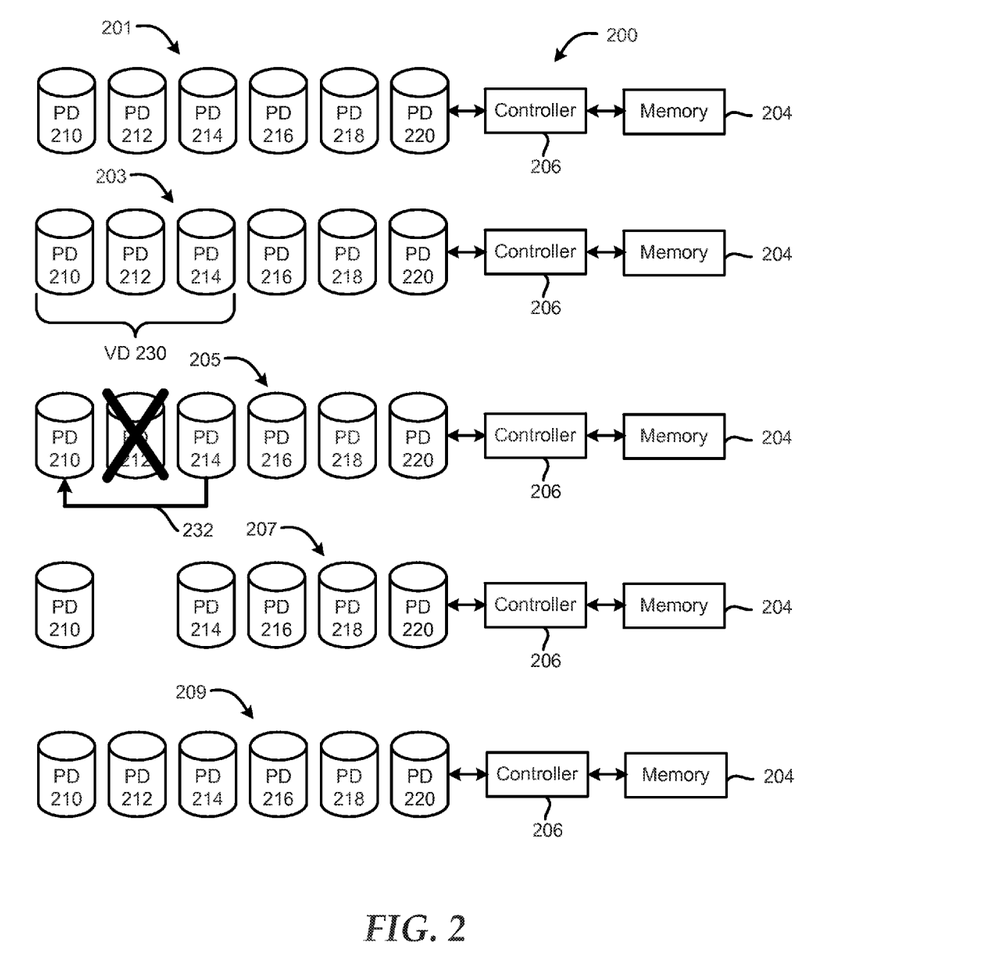
FIG. 2 is a diagram of an embodiment of physical disks within the information handling system in a first configuration.

FIG. 2 illustrates portions of an information handling system 200 including physical disks 210, 212, 214, 216, 218, and 220 (210-220), a memory 204, and a controller 206. In an embodiment, communication between the physical disks 210-220 and the memory 204 can be implemented via a controller, such as controller 206. During startup of the information handling system 200, the controller 206 can be populated with identification of each of the physical disks 210-220 in a configuration 201. The controller 206 can then allocate a portion of the memory 204 to store metadata associated with the configuration 201 of the physical disks 210-220, such as metadata indicating that all of the physical disks are in a ready state. An individual can then interface with the controller 206 to create a RAID1 configuration 203 utilizing physical disks 210 and 212. The controller 206 can then create a virtual disk 230 for the RAID1 configuration 203 with physical disks 210 and 200 as the RAID disks and physical disk 214 as the DHS for the virtual disk. The controller 206 can update the metadata on the memory 204 for the new configuration 203 of the physical disks 210-220, to include information that physical disks 210 and 212 are part of virtual disk 230, and that physical disk 214 is the DHS of the virtual disk. After the metadata is updated on the memory 204, the controller 206 can then synchronize the metadata to each of the physical disks 210-220.

The physical disks 210-220 can be placed in a configuration 205 in response to physical disk 212 being pulled out of the information handling system 200. As a result, virtual disk 230 can transition into a degraded state and the virtual disk can start rebuilding via communication between the physical disks 214 and 210 on a communication link 232. In an embodiment, the communication 232 between physical disks 210 and 214 can be a direct communication link, can be through the controller 206, or the like. After the virtual disk 230 is rebuilt, the controller 206 can update the metadata in the memory 204, based on configuration 205, to clear metadata information associated with physical disk 212, to identify physical disks 210 and 214 as members of the virtual disk 230, and to identify that the virtual disk is in a degraded state.

The individual can interface with controller 206 to delete the virtual disk 230 in the RAID1 configuration and no longer have physical disk 214 as a DHS. The controller 206 can update the metadata in the memory 204 to indicate these configuration changes as configuration 207, and can then synchronize the metadata from the memory to each of the physical disks. Thus, the metadata in the memory 204 and on each of the physical disks 210 and 214-220 can identify that each of physical disks 210 and 214-200 are in the ready state. Then, physical disk 212 can be reinserted into the information handling system 200 to create a configuration 209. The physical disk 212 can include the metadata stored on it when the physical disk was removed from the information handling system, such as metadata indicating that physical disks 210 and 212 are in virtual disk 230 and physical disk 214 is the DHS for the virtual disk.

However, since physical disk 212 is the only physical disk with metadata associated with the virtual disk 230, the controller 206 will identify that a new physical disk has been added to the information handling system 200, and can update the metadata in the memory 204 with the metadata for virtual disk 230 found in physical disk 212. This updated metadata can include that the RAID1 virtual disk 230 is in a degraded state because only physical disk 212 is included within the virtual disk. The controller 206 can then synchronize the updated metadata from the memory 204 to all physical disks 210-220. In this embodiment, the degraded virtual disk 230 only includes physical disk 212 with a physical disk as a DHS, and as a result the virtual disk will not be rebuilt because no DHS physical disk is included in the virtual disk 230. Thus, in this embodiment, the controller 206 can utilize the portion of the memory 204 allocated to the physical disks 210-220 to maintain the master metadata and the controller can synchronized the metadata from the memory to each on the physical disk present in the information handling system 200.

Figure 3:
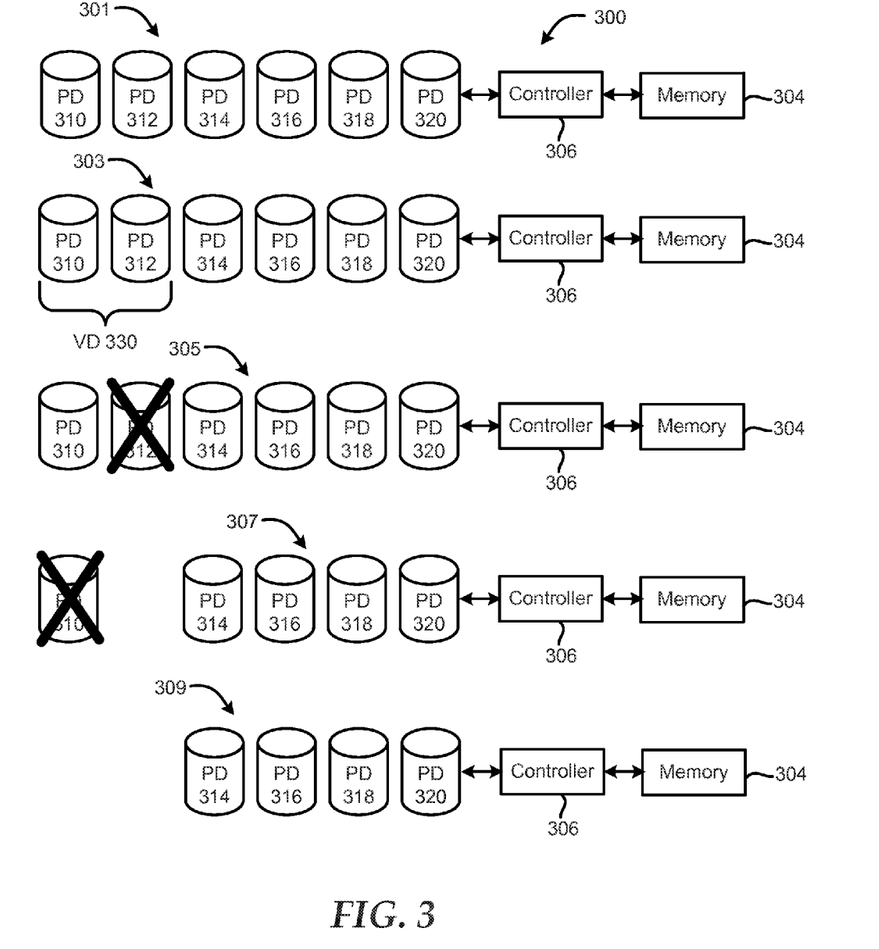
FIG. 3 is a diagram of another embodiment of the physical disks within the information handling system in a second configuration.

FIG. 3 illustrates portions of an information handling system 300 including physical disks 310, 312, 314, 316, 318, and 320 (310-320), a memory 304, and a controller 306. In an embodiment, communication between the physical disks 310-320 and the memory 304 can be implemented via a controller, such as controller 306. During startup of the information handling system 300, the controller 306 can be populated with identification of a configuration 301 of each of the physical disks 310-320. The controller 306 can then allocate a portion of the memory 304 to store metadata of the physical disks 310-320, such as metadata indicating that all of the physical disks are in a ready state. An individual can then interface with the controller 306 to create a RAID1 configuration 303 utilizing physical disks 310 and 312. The controller 306 can then create a virtual disk 330 for the RAID1 configuration 303 with physical disks 310 and 312 as the RAID disks. The controller 306 can update the metadata on the memory 304 to include information associated with configuration 303. In particular, the metadata can indicate that physical disks 310 and 312 are part of virtual disk 330. After the metadata is updated on the memory 304, the controller 306 can synchronize the metadata to each of the physical disks 310-320.

An individual can cause the physical disks to be placed in configuration 305 by removing physical disk 312 from the information handling system 300. In response to the creation of configuration 305, virtual disk 330 can transition into a degraded state with only physical disk 310 as part of the virtual disk. The controller 306 can then update the metadata in the memory 304 to clear metadata information associated with physical disk 312, to identify physical disk 310 as the only member of the virtual disk 330, and to identify that the virtual disk is in a degraded state. After the metadata is updated in the memory 304, the controller 306 can then synchronize the metadata to each of the physical disks 310 and 314-320.

The physical disks can then be placed in configuration 307 in response to physical disk 310 being pulled out of the information handling system 300. Configuration 307 results in virtual disk 330 no longer being identified in the controller 306 because of both of the physical disks 310 and 312 assigned to the virtual disk are no longer present. The controller 306 can then update the metadata in the memory 304 to clear metadata information associated with physical disk 310, to clear the information associated with the virtual disk 330, and to identify that the virtual disk is in a degraded state. After the metadata is updated in the memory 304, the controller 306 can then synchronize the metadata to each of the remaining physical disks 314-320, such that the metadata for physical disk 310 and 312 and the virtual disk 330 are cleared from each of the remaining physical disks. At this point, the controller 306 identifies configuration 309 of the remaining physical disks 314-320 in the metadata, and can store the metadata on the memory 304 and each of the physical disks. For example, the metadata can contain information that no RAID has been configured, but that physical disks 314-320 are in a ready state. Thus, in this embodiment, the controller 306 can utilize the portion of the memory 304 allocated to the physical disks 310-320 to maintain the master metadata and the controller can synchronized the metadata from the memory to each on the physical disk present in the information handling system 300.

Figure 4:
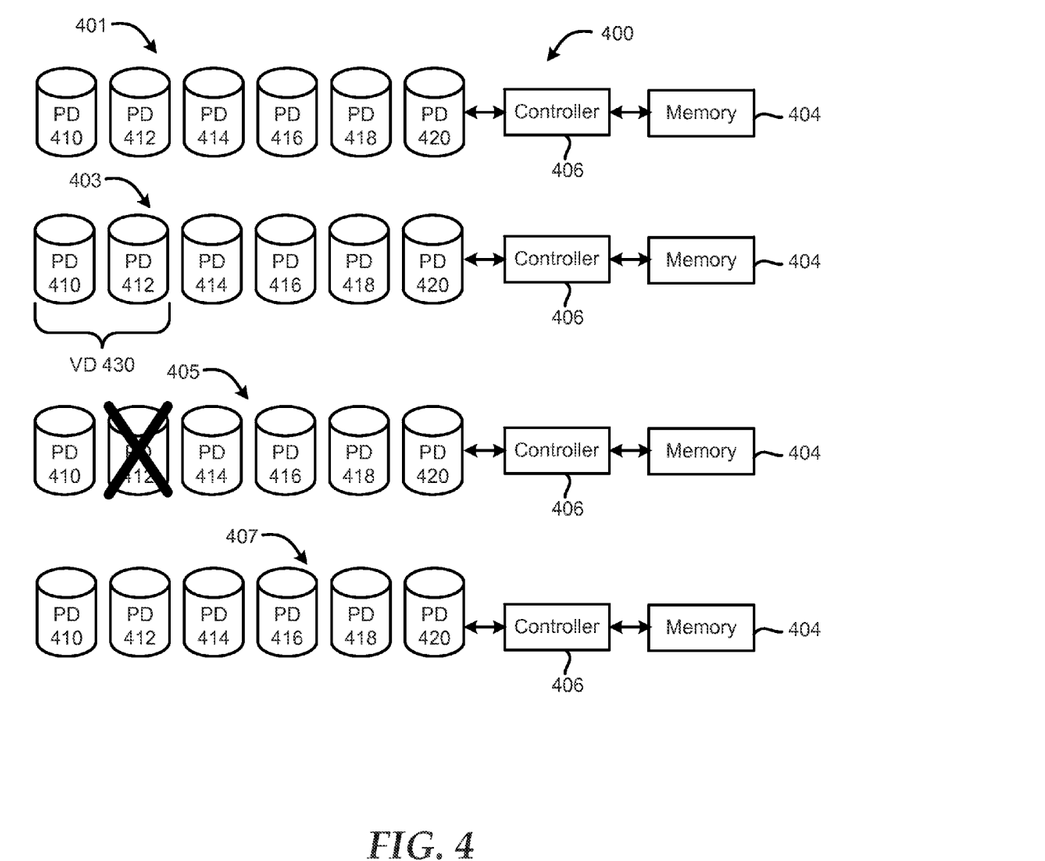
FIG. 4 is a diagram of another embodiment of physical disks within the information handling system in a third configuration.

FIG. 4 illustrates portions of an information handling system 400 including physical disks 410, 412, 414, 416, 418, and 420 (410-420), a memory 404, and a controller 406. In an embodiment, communication between the physical disks 410-320 and the memory 404 can be implemented via a controller, such as controller 406. During startup of the information handling system 400, the controller 406 can be populated in configuration 401 an identify each of the physical disks 410-420. The controller 406 can then allocate a portion of the memory 404 to store metadata associated with the configuration 401 of the physical disks 410-420, such as metadata indicating that all of the physical disks are in a ready state. An individual can then interface with the controller 406 to create a RAID1 configuration 403 utilizing physical disks 410 and 412. The controller 406 can then create a virtual disk 430 for the RAID1 configuration 403 with physical disks 410 and 412 as the RAID disks. The controller 406 can update the metadata on the memory 404 to include information that physical disks 410 and 412 are part of virtual disk 430. In an embodiment, the controller 406 can include a configuration number for the metadata on the memory 404. For example, the controller 406 can increment a configuration number for the metadata each time the metadata is updated on the memory 404. In another embodiment, the configuration number can be decremented with each update to the metadata on the memory 404. After the metadata is updated on the memory 404 and the configuration number is updated, the controller 406 can synchronize the metadata and configuration number to each of the physical disks 410-420.

The physical disks can enter into configuration 405 in response to physical disk 412 being pulled out of the information handling system 400. In configuration 405, virtual disk 430 can transition into a degraded state with only physical disk 410 as part of the virtual disk. The controller 406 can then update the metadata in the memory 404 to clear metadata information associated with physical disk 412, to identify physical disk 410 as the only member of the virtual disk 430, and to identify that the virtual disk is in a degraded state. The controller 406 can then update the configuration number for the metadata in the memory 404. After the metadata is updated in the memory 404, the controller 406 can then synchronize the metadata and configuration number to each of the remaining physical disks 410 and 414-420.

Configuration 407 can result when physical disk 412 is reinserted into the information handling system 400. The controller 406 can retrieve the metadata from the newly inserted physical disk and can identify that the inserted physical disk is physical disk 412 that was part of virtual disk 420. The controller 406 can also retrieve configuration number associated with the metadata retrieved from the physical disk 412. The controller 406 can then compare the configuration information for the physical disk 412 with the configuration number of the memory 404 to determine the most recently updated metadata. For example, the configuration number for the metadata on the physical disk 412 can be two, and the configuration number for the metadata on the memory 404 can be three. In this situation, the controller 406 can determine that the metadata stored in the memory 404 has been updated most recently.

The controller 406 can use the metadata on the memory 404, based on the configuration number in the memory being the highest, to determine what action, if any, is needed in response to physical disk 412 being inserted in the information handling system 400. In an embodiment, the controller 406 can determined that the virtual disk 430 for the RAID1 configuration needs to be rebuilt to include both physical disk 410 and physical disk 412. The controller 406 can start the rebuilding of virtual disk 430, can then update the metadata on memory 404, and can update the configuration number for the metadata. The controller 406 can then synchronize the metadata from the memory 404 to each of the physical disks 410-420. Thus, in this embodiment, the controller 406 can utilize the portion of the memory 404 allocated to the physical disks 410-420 to maintain the master metadata. The controller 406 can also utilize a configuration number to identify the metadata that has been updated most recently. The memory 404 and configuration number can be utilized by the controller to maintain consistency of the metadata on the memory and each physical disk present in the information handling system 400.

Figure 5:
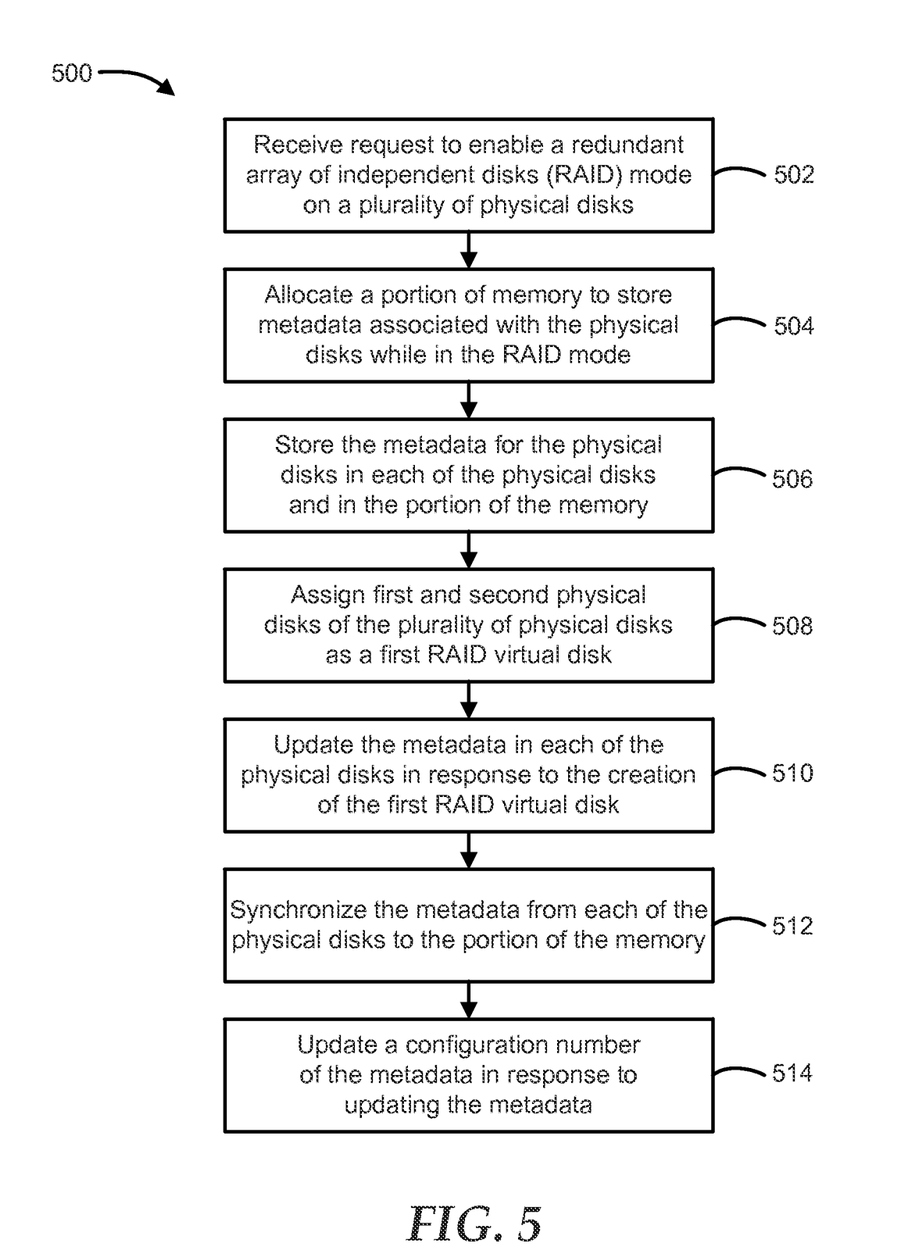
FIG. 5 is a flow diagram of a method for maintaining consistent metadata between the physical disks and a memory of the information handling system.

FIG. 5 shows a flow diagram of a method 500 for maintaining metadata consistency between physical disks and a memory of an information handling system. At block 502, a request to enable a redundant array of independent disks (RAID) mode on the physical disks is received at a controller. A portion of the memory is allocated to store metadata for the physical disks while the information handling system is in the RAID mode at block 504. In an embodiment, the memory is external to each of the physical disks, and the portion of the memory is a contiguous portion of the memory dedicated to the metadata associated with the physical disks while the information handling system is in the RAID mode. In an embodiment, the memory is a basic input/output-serial peripheral interface (BIOS-SPI) flash memory.

At block 506, the metadata for the physical disks is stored in each of the physical disks and in the portion of the memory. First and second physical disks are assigned as a first RAID virtual disk at block 508. At block 510, the metadata in each of the physical disks is updated to include that the first and second physical disks are part of the first RAID virtual disk. The metadata in each of the physical disks is synchronized to the portion of the memory at block 512. At block 514, a configuration number, in the memory, for the metadata is updated in response to the metadata being updated. In an embodiment, the configuration number is utilized to determine the metadata to use to reconfigured the physical disks if a discrepancy occurs between metadata in the information handling system.

Modifications, additions, or omissions may be made to the information handling system 100 described herein without departing from the scope of the disclosure. For example, information handling system 100 may include any number of controllers 106, processors 102, memories 104, disk arrays 108, or hard disk drives 110, 120, or 130. The components may be integrated or separated. Moreover, the operations may be performed by more, fewer, or other components. Additionally, the operations may be performed using any suitable logic comprising software, hardware, and/or other logic.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a plurality of physical disks;
a memory to store metadata for the physical disks, wherein the memory is a basic input/output-serial peripheral interface (BIOS-SPI) flash memory; and
a controller configured to communicate with the physical disks and with the memory, the controller to receive a request to enable a redundant array of independent disks (RAID) mode on the physical disks, to allocate a portion of the memory to store the metadata while in the RAID mode, to store the metadata for the physical disks in each of the physical disks and in the portion of the memory, wherein the metadata includes that one of the physical disks is a disk host system disk for a virtual disk, to update and synchronize the metadata in response to a configuration change of the physical disks, to detect insertion of a new physical disk, to retrieve metadata from the newly inserted physical disk, to identify that the newly inserted disk was previously part of the virtual disk, to identify the disk host system disk for the virtual disk based on the metadata from the newly inserted physical disk, and to determine whether to rebuild the virtual disk based on whether the disk host system disk is still connected to the information handling system.

2. The information handling system of claim 1, the controller further to update a configuration number of the metadata in response to updating the metadata.

3. The information handling system of claim 1, the controller further to assign first and second physical disks out of the physical disks as a RAID virtual disk, to update the metadata to create first metadata for the RAID virtual disk in the portion of the memory, and to store the first metadata in the portion of the memory and in each of the physical disks.

4. The information handling system of claim 3, the controller further to detect removal of the first physical disk, to update the first metadata to create second metadata for the RAID virtual disk in response to the first physical disk being removed, wherein the second metadata is stored in each of the remaining physical disks and in the portion of the memory.

5. The information handling system of claim 4, wherein information associated with the first physical disks is removed from the first metadata when updated to the second metadata, and the second metadata identifies the RAID virtual disk as in a degraded state with the second physical disk as the only physical disk assigned to the RAID virtual disk.

6. The information handling system of claim 1, wherein the portion of the memory is a contiguous portion of the memory dedicated to the metadata associated with the physical disks in the RAID mode.

7. A method comprising:
receiving, at a controller, a request to enable a redundant array of independent disks (RAID) mode on a plurality of physical disks within an information handling system;
allocating a portion of a memory to store metadata for the physical disks while in the RAID mode, wherein the memory is external to each of the physical disks, and wherein the memory is a basic input/output-serial peripheral interface (BIOS-SPI) flash memory;
storing the metadata for the physical disks in each of the physical disks and in the portion of the memory, wherein the metadata includes that one of the physical disks is a disk host system disk for a virtual disk;
updating and synchronizing the metadata in response to a configuration change of the physical disks;
detecting insertion of a new physical disk;
retrieving metadata from the newly inserted physical disk;
identifying whether the newly inserted disk was previously part of the virtual disk based on the metadata from the newly inserted physical disk;
identifying the disk host system disk for the virtual disk based on the metadata from the newly inserted physical disk; and
determining whether to rebuild the virtual disk based on whether the disk host system disk is still connected to the information handling system.

8. The method of claim 7 further comprising:
updating a configuration number of the metadata in response to updating the metadata.

9. The method of claim 7 further comprising:
assigning first and second physical disks out of the physical disks as a RAID virtual disk;
updating the metadata to create first metadata for the RAID virtual disk in the portion of the memory;
storing the first metadata in the portion of the memory and in each of the physical disks.

10. The method of claim 9 further comprising:
detecting removal of the first physical disk; and
updating the first metadata to create second metadata for the RAID virtual disk in response to the first physical disk being removed, wherein the second metadata is stored in each of the remaining physical disks and in the portion of the memory.

11. The method of claim 10 wherein information associated with the first physical disks is removed from the first metadata when updated to the second metadata, and the second metadata identifies the RAID virtual disk as in a degraded state with the second physical disk as the only physical disk assigned to the RAID virtual disk.

12. The method of claim 7 wherein the portion of the memory is a contiguous portion of the memory dedicated to the metadata associated with the physical disks in the RAID mode.

13. A non-transitory computer readable medium including code to cause a processor to perform a method, the method comprising:
receiving a request to enable a redundant array of independent disks (RAID) mode on a plurality of physical disks within an information handling system;
allocating a portion of a memory to store metadata for the physical disks while in the RAID mode, wherein the memory is external to each of the physical disks, and wherein the memory is a basic input/output-serial peripheral interface (BIOS-SPI) flash memory;
storing the metadata for the physical disks in each of the physical disks and in the portion of the memory, wherein the metadata includes that one of the physical disks is a disk host system disk for a virtual disk; and
updating and synchronizing the metadata in response to a configuration change of the physical disks;
detecting insertion of a new physical disk;
retrieving metadata from the newly inserted physical disk;
identifying whether the newly inserted disk was previously part of the virtual disk based on the metadata from the newly inserted physical disk;
identifying the disk host system disk for the virtual disk based on the metadata from the newly inserted physical disk; and
determining whether to rebuild the virtual disk based on whether the disk host system disk is still connected to the information handling system.

14. The non-transitory computer readable medium of claim 13 wherein the method further comprises:
updating a configuration number of the metadata in response to updating the metadata.

15. The non-transitory computer readable medium of claim 13 wherein the method further comprises:
assigning first and second physical disks out of the physical disks as a RAID virtual disk;
updating the metadata to create first metadata for the RAID virtual disk in the portion of the memory;
storing the first metadata in the portion of the memory and in each of the physical disks.

16. The non-transitory computer readable medium of claim 15 wherein the method further comprises:
detecting removal of the first physical disk; and
updating the first metadata to create second metadata for the RAID virtual disk in response to the first physical disk being removed, wherein the second metadata is stored in each of the remaining physical disks and in the portion of the memory.

17. The non-transitory computer readable medium of claim 16 wherein information associated with the first physical disks is removed from the first metadata when updated to the second metadata, and the second metadata identifies the RAID virtual disk as in a degraded state with the second physical disk as the only physical disk assigned to the RAID virtual disk.

18. The non-transitory computer readable medium of claim 13 wherein the portion of the memory is a contiguous portion of the memory dedicated to the metadata associated with the physical disks in the RAID mode.

* * * * *